US012086260B1

(12) United States Patent
Rajagopalan et al.

(10) Patent No.: US 12,086,260 B1
(45) Date of Patent: Sep. 10, 2024

(54) SYSTEMS AND METHODS FOR OVER THE AIR (OTA) RECOVERY OF BASIC INPUT/OUTPUT SYSTEM (BIOS) FIRMWARE

(71) Applicant: DELL PRODUCTS L.P., Round Rock, TX (US)

(72) Inventors: Vivekanandh Narayanasamy Rajagopalan, Bangalore (IN); Anand Prakash Joshi, Round Rock, TX (US); Hemanth Venkatesh Murthy, Bangalore (IN); Ibrahim Sayyed, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 18/110,667

(22) Filed: Feb. 16, 2023

(51) Int. Cl.
*G06F 15/177* (2006.01)
*G06F 9/00* (2018.01)
*G06F 9/4401* (2018.01)
*G06F 21/57* (2013.01)
*H04W 12/00* (2021.01)

(52) U.S. Cl.
CPC .......... *G06F 21/572* (2013.01); *G06F 9/4401* (2013.01); *G06F 9/4416* (2013.01); *G06F 15/177* (2013.01); *H04W 12/009* (2019.01)

(58) Field of Classification Search
None
See application file for complete search history.

(56) References Cited

U.S. PATENT DOCUMENTS

| 8,910,139 | B2 * | 12/2014 | Li ......................... H04L 9/3247 717/172 |
| 9,853,748 | B2 | 12/2017 | Prendergast et al. |
| 10,326,599 | B2 * | 6/2019 | Laffey .................. G06F 21/575 |

(Continued)

OTHER PUBLICATIONS

Skehar Suryanarayana et al., "Disaster Recover Preparedness With Trusted Firmware Boot Method Over a Smart Phone", U.S. Appl. No. 17/722,762, filed Apr. 18, 2022, 45 pgs.

(Continued)

*Primary Examiner* — Nitin C Patel
(74) *Attorney, Agent, or Firm* — Egan, Enders & Huston LLP.

(57) ABSTRACT

Systems and methods are provided to perform BIOS recovery for a first information handling system that is in a no-boot state, i.e., in which the original equipment manufacturer (OEM) boot block (OBB) on the first information handling system is corrupted or damaged and thus does not properly execute. OBB BIOS recovery may be achieved using logic executing on a second and different information handling system that is wirelessly communicating with initial boot block (IBB) BIOS firmware that is executing on the first information handling system. The logic executing on the second information handling system may select and download (e.g., from a remote server) a correct uncorrupted and undamaged copy of the BIOS recovery firmware version for the first information handling system, and then wirelessly transfer the downloaded new copy of the OBB BIOS firmware version to the first information handling system via an established secure wireless connection.

20 Claims, 7 Drawing Sheets

(56) References Cited

U.S. PATENT DOCUMENTS

| | | | |
|---|---|---|---|
| 11,194,374 B2 | 12/2021 | Hamlin et al. | |
| 2009/0320012 A1* | 12/2009 | Lee | G06F 8/65 |
| | | | 714/758 |

OTHER PUBLICATIONS

Tianocore, Github, "OBB Verification", Aug. 29, 2019, 2 pgs.
Dell Command I Cloud Repository Manager, Administrator Guide v1.12 and later, Oct. 2021, 33 pgs.
Intel, White Paper, "Open Source UEFI Firmware Enabling Guide: Intel Atom Processor E3900 Series Platforms", Aug. 2018, 42 pgs.

* cited by examiner

SYSTEMS AND METHODS FOR OVER THE AIR (OTA) RECOVERY OF BASIC INPUT/OUTPUT SYSTEM (BIOS) FIRMWARE

This invention relates generally to information handling systems and, more particularly, to system BIOS for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a computer system, basic input/output system (BIOS) is a system firmware component that loads and executes before an operating system (OS) on the computer system. Any corruption or tampering in the BIOS firmware results in a no-boot scenario for the computer system. A conventional BIOS firmware image is typically divided into two firmware components that include an initial boot block (IBB) and an original equipment manufacturer (OEM) boot block (OBB). The IBB is a smaller firmware block than the OBB, and includes instructions for basic tasks such as initiating communication between hardware components of the computer system (e.g., embedded controller, platform controller hub, central processing unit, etc.) and for loading the OBB. The OBB is a larger firmware block than the IBB, and includes additional code instructions particular to the platform design of the computer system (e.g., such as for initializing an OS loader and/or drivers to load and boot the operating system on the host central processing unit, etc.). The IBB is the first BIOS code component to execute, and loads before the OBB. The IBB then loads the OBB into volatile system memory (e.g., dynamic random access memory "DRAM") and transfers control to the OBB after security verifications are completed. Firmware components of the OBB include driver execution environment (DXE) Drivers, Boot Devices (BDS), etc.

Corruption or tampering in the system BIOS firmware may result in either or both of the IBB or OBB firmware components becoming corrupted. In the case of IBB firmware corruption, there are two copies (i.e., primary and secondary copies) of IBB firmware that are conventionally maintained with OBB in serial peripheral interface (SPI) Flash memory of a computer system. If the primary copy of the IBB firmware is found to be corrupted, then the secondary IBB is loaded and used after security verification.

The relatively small size of the IBB firmware component allows two copies of the IBB firmware component to be maintained in SPI Flash memory without consuming an unacceptable amount of memory space within the SPI Flash memory device. However, multiple copies of the OBB firmware component cannot be maintained on the SPI Flash memory device because the OBB firmware component is much larger than the IBB firmware component. Therefore, in the case that the OBB is corrupted, then an OBB recovery image must be loaded from a larger non-volatile memory device, i.e., from a hard drive or an external universal serial bus (USB) drive (key). In an OBB firmware recovery scenario, the IBB firmware executes to help recover the OBB Block.

In the case of OBB corruption, a conventional computer system will not boot up to the operating system (OS), and an end user of the computer system has no visibility or know-how to recover the computer system. In this regard, BIOS firmware recovery using a USB drive requires the technical know-how to perform an error prone manual process of first downloading the correct BIOS firmware to the USB drive, and then booting the system from the USB drive to perform the recovery process. As a consequence, the typical end user must seek help from technical support personnel by either carrying the computer system to a technical support service center to obtain assistance with recovery of the system BIOS and boot up of the system with a recovery image, or by arranging for an onsite service technician or engineer to visit the end user premises to recover the system BIOS and boot up the system with a recovery image. Either of these actions creates a negative experience for the end user.

A customer voice support option is typically ineffective at recovering system BIOS and booting up a computer system having OBB corruption since customer support executives cannot provide any guidance to the end user when no system I/O is initialized, leading to longer resolution time. If a BIOS recovery image is available on a system hard drive, an auto-recovery can be attempted. However, if the system hard drive is not accessible or formatted, then auto-recovery cannot be attempted as the recovery image is either inaccessible or lost.

SUMMARY

Disclosed herein are systems and methods that may be wirelessly implemented (e.g., in a no-boot scenario) to perform basic input/output system (BIOS) recovery over the air for an information handling system. In on embodiment of the disclosed systems and methods, BIOS recovery may be implemented in a no-boot scenario to recover the BIOS for the information handling system without requiring an end user to take the information handling system to a service center, and without requiring a service technician to visit the end user premises.

In one embodiment, the disclosed systems and methods may be implemented to perform BIOS recovery for a first information handling system that is in a no-boot state, i.e., in which an original equipment manufacturer (OEM) boot block (OBB) on the first information handling system is corrupted or damaged and thus does not properly execute. In this embodiment, OBB BIOS recovery may be achieved using logic (e.g., a software or firmware application) executing on a programmable integrated circuit of a second and different information handling system that is wirelessly communicating with initial boot block (IBB) BIOS firmware (FW) that is executing on a programmable integrated circuit of the first information handling system that is in the no-boot state. In one exemplary embodiment, a custom profile executing on the first information handling system may exchange preconfigured secret key/s with a custom profile executing on the second information handling system to establish a secure wireless connection between the first information handling system and the second information handling system. The logic executing on the second information handling system may select and download (e.g., from a remote server) a new copy of the latest correct uncorrupted and undamaged OBB BIOS recovery firmware version for the first information handling system, and then wirelessly transfer the downloaded new copy of the OBB BIOS firmware version to the first information handling system via the established secure wireless connection. In such an embodiment, examples of first and second information handling systems with which the disclosed systems and methods may be implemented include, but are not limited to, notebook or desktop computers, convertible or tablet computers, all-in-one computers, smart phones, etc.

In one embodiment, the secure wireless connection may be established between the first information handling system and the second information handling system for file transfer and notification using a secure communication stack (e.g., a Bluetooth protocol stack implemented as a Bluetooth firmware stack) that is implemented by an in-built wireless firmware volume (FV) which may be stored outside the boot block (e.g., IBB, OBB) of the first information handling system to avoid corruption. For example, a unified extensible firmware interface (UEFI) Bluetooth firmware stack may be employed to establish the secure wireless connection between the first information handling system and the second information handling system. The UEFI Bluetooth firmware stack may be independent of the rest of the components in pre-EFI initialization (PEI) and driver execution environment (DXE) phases, and thus light weight in size and execution. Although a normal IEEE 802.11x WI-FI firmware stack has multiple dependencies (e.g., such as TCP/IP, HTTPS, TLS and other network/UI components), a WI-FI firmware stack may be alternatively employed in another embodiment to establish the secure wireless connection between the first information handling system and the second information handling system.

In one respect, disclosed herein is a method, including: reading an existing basic input/output system (BIOS) boot block from a non-volatile memory of a first information handling system; attempting to verify integrity of the existing BIOS boot block of the first information handling system. If integrity of the existing BIOS boot block of the first information handling system is verified, then the method includes loading and executing the existing BIOS boot block from the non-volatile memory of the first information handling system and booting an operating system (OS) of the first information handling system. However, if integrity of the existing BIOS boot block of the first information handling system is not verified, then the method includes instead establishing a secure wireless connection between the first information handling system and a second and different information handling system, then downloading a new copy of the BIOS boot block across the secure wireless connection from the second information handling system to the first information handling system, then storing the new copy of the BIOS boot block on the non-volatile memory of the first information handling system, and then loading and executing the new BIOS boot block of the first information handling system from the non-volatile memory of the first information handling system and booting the operating system (OS) of the first information handling system.

In another respect, disclosed herein is a system, including a first information handling system that includes at least one first programmable integrated circuit coupled to a non-volatile memory, and a first radio coupled between a first antenna and the at least one first programmable integrated circuit. The at least one first programmable integrated circuit is programmed to: read an existing basic input/output system (BIOS) boot block from the non-volatile memory of a first information handling system; and attempt to verify integrity of the existing BIOS boot block of the first information handling system. If integrity of the existing BIOS boot block of the first information handling system is verified, then the at least one first programmable integrated circuit is programmed to load and execute the existing BIOS boot block from the non-volatile memory of the first information handling system and boot an operating system (OS) of the first information handling system. However, if integrity of the existing BIOS boot block of the first information handling system is not verified, then the at least one first programmable integrated circuit is programmed to instead: establish a secure wireless connection via the first radio and the first antenna between the first information handling system and a second and different information handling system, then download a new copy of the BIOS boot block across the secure wireless connection from the second information handling system to the first information handling system, then store the new copy of the BIOS boot block on the non-volatile memory of the first information handling system, and then load and execute the new BIOS boot block of the first information handling system from the non-volatile memory of the first information handling system and boot the operating system (OS) of the first information handling system.

DESCRIPTION OF ILLUSTRATIVE EMBODIMENTS

Figure 1A:
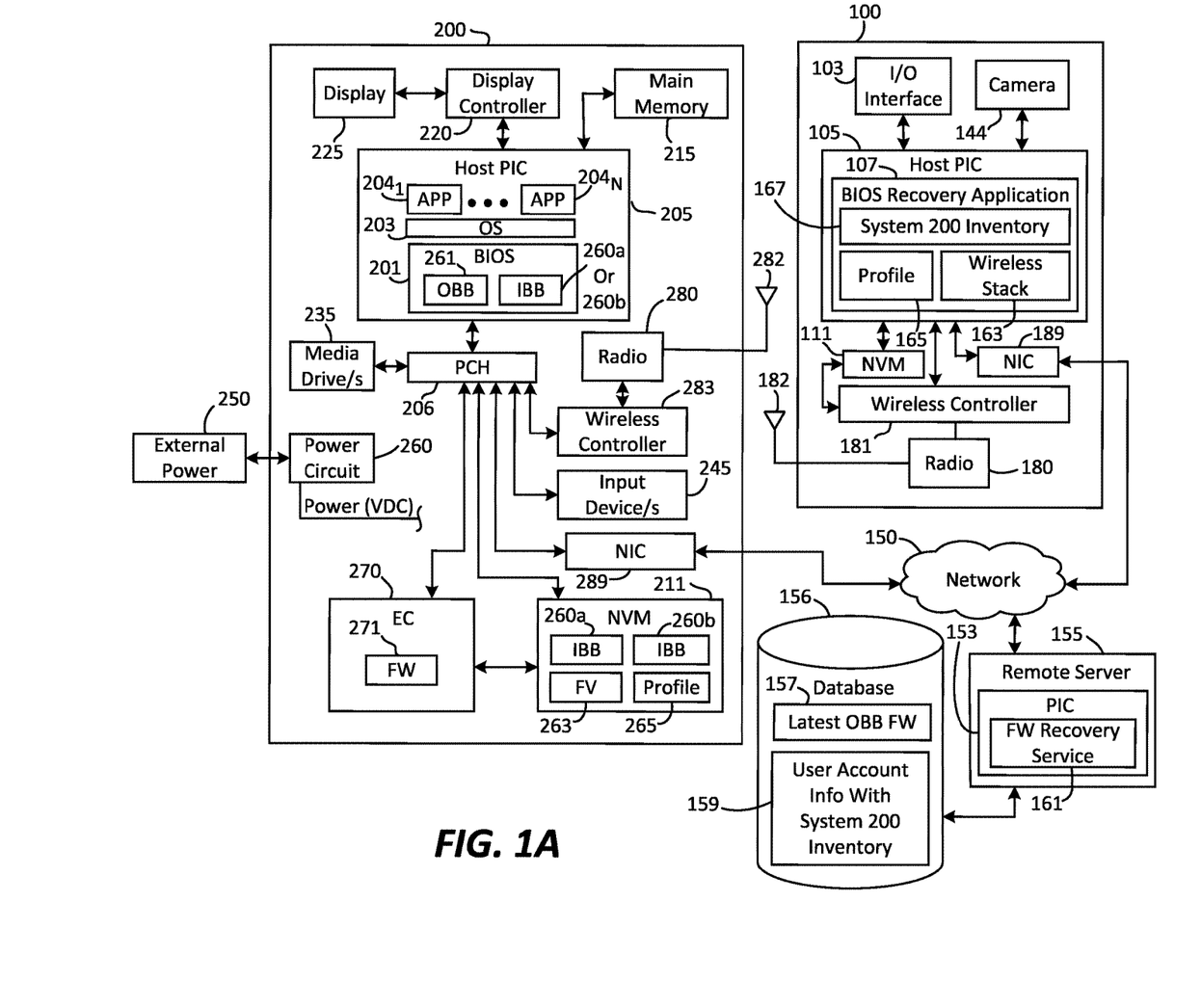
FIG. 1A is a block diagram illustrating a wireless communication environment according to one exemplary embodiment of the disclosed systems and methods.

FIG. 1A is a block diagram of one embodiment of a wireless communication environment that includes a wireless information handling system 100 and another wireless information handling system 200. In FIG. 1A, wireless information handling system 100 may be, for example, a mobile wireless information handling system such as a smart phone, tablet computer, etc. In an alternate embodiment, wireless information handling system 100 may be a personal computer such as a desktop computer, laptop or notebook computer, all-in-one computer, etc. As shown in FIG. 1A, wireless information handling system 100 has an antenna 182 that is positioned within wireless communication range of an antenna 282 of the other wireless information handling system 200. In one embodiment, wireless information handling system may be a personal computer system (e.g., a desktop computer, laptop or notebook computer, all-in-one computer, etc.).

In the embodiment of FIG. 1A, information handling system 100 includes a host programmable integrated circuit 105 (e.g., central processing unit "CPU") that is programmed to execute a BIOS recovery application 107 (e.g., a "companion" application) that includes wireless firmware stack 163 (e.g., firmware stack for Classic Bluetooth protocol also known as Bluetooth Classic protocol or other appropriate wireless firmware stack) and custom profile 165 (e.g., generic attribute profile (GATT) device profile that defines Classic Bluetooth GATT commands and requests (as well as notifications and indications) that may be executed by BIOS recovery application 107 for communication between information handling system 100 and information handling system 200 in order to provide functionality for file transfer and notification. Also shown coupled to host programmable integrated circuit 105 are camera 144 and I/O interface 103. In one embodiment, I/O interface may be a touchscreen display that displays video content and accepts user touch input, e.g., such as a graphical user interface (GUI).

In one embodiment, BIOS recovery application 107 may be a mobile application in the case that wireless information handling system 100 is a mobile wireless information handling system such as a smart phone, convertible, tablet or notebook computer. In another embodiment, BIOS recovery application 107 may be a universal Windows platform (UWP) application (e.g., such as My Dell UWP application available from Dell Technologies Inc. of Round Rock, Texas) in the case that wireless information handling system 100 is a personal computer executing a Windows-based OS such as a desktop computer, laptop or notebook computer, all-in-one computer, etc.). As will be described further herein, BIOS recovery application 107 is responsible for downloading a new latest uncorrupted and undamaged copy of the correct (e.g., assigned) BIOS firmware (e.g., including a OBB) for a separate information handling system 200 that is owned by a current user of information handling system 100. Non-volatile memory (NVM) 111 may also be present on device 100 for storing code, identification information, etc. that is accessible for reading and writing by wireless controller 181 (described further herein) and host programmable integrated circuit 105.

Host programmable integrated circuit 105 of peripheral device 100 is in turn coupled to exchange data between BIOS recovery application 107 and wireless controller 181 which may be, for example, a microcontroller executing logic components of Classic Bluetooth wireless protocol, e.g., Bluetooth 4.x version (Bluetooth 4.0, 4.1, 4.2, etc.) core specification protocol and/or Bluetooth 5.x version (including Bluetooth 5.0, 5.1, 5.2, 5.3, etc.) core specification protocol that are each available together with addendums and supplements thereto from the Bluetooth Special Interest Group (SIG). Host programmable integrated circuit 105 may also be programmed to execute code and/or application programming interfaces (APIs), and to provide communication data to wireless controller 181 (e.g., data that includes information for advertisement, services, encryption, authentication, pairing, connection, bonding, etc.) that facilitates Classic Bluetooth wireless communication between information handling system 100 and components of information handling system 200. In alternate embodiments, other types of wireless communication technology may be utilized between information handling system 100 and information handling system 200 to implement the disclosed systems and methods. Examples of these other possible types of wireless communication technology include, but are not limited to, non-Bluetooth wireless communication protocols such as IEEE 802.11x WiFi protocol, IEEE 802.15.4 Zigbee protocol, near field communication (NFC) protocol such as ISO/IEC 14443 and FeliCa, ISO/IEC 18092, GSMA NFC Standards, etc.

Wireless controller 181 may be in turn configured to manage transmission from information handling system 100 of the data provided from host programmable integrated circuit 105 by providing this data as outgoing wireless protocol data in a controlled manner for transmission via antenna element/s 182 by radio hardware module (or radio) 180, which may include one or more radio circuit components such as baseband processor, transmitter, receiver, transceiver, etc. Wireless controller 181 may also manage incoming wireless protocol data received via antenna element/s 182 and radio hardware module 180 from information handling system 200. Wireless controller 181 in turn passes this received data to host programmable integrated circuit 105 for further processing. In this way, wireless controller 181 may exchange wireless protocol data (e.g., negotiation and connection requests, authentication information, user input data, other end device data, etc.) with information handling system 200.

Host programmable integrated circuit 105 may also be coupled as shown to network interface controller (NIC) 189 that is in wired and/or wireless network communication across network 150 (e.g., Internet, corporate network) with a remote server information handling system 155. NIC 189 may optionally communicate with network 150 via one or more intervening networks, e.g., such as a wired or wireless local area network (LAN). In one embodiment, remote server 155 may be configured with one or more components (e.g., including a host programmable integrated circuit "PIC" 153) similar to information handling system 200, and may operate to host a cloud-based firmware repository service 161 (e.g., such as Dell Client Command Repository Manager (DCCRM) available from Dell Technologies of Round Rock, Texas). As shown, remote server 155 may be coupled to access a remote database 156 (e.g., internal or external SSD, hard drive, or other NVM) that stores information including uncorrupted and undamaged code for the latest version of OBB firmware 261 appropriate for execution by separate information handling system 200 as described herein. Remote database 156 may also include user account information 159 that contains an inventory of firmware components (e.g., including firmware components) that are assigned to a particular information handling system 200 or a user account assigned to an owner or user of system 200 (e.g., part of a sales order for system 200, registered to a customer, user or owner of system 200, etc.).

It will be understood that the particular configuration of information handling system 100 illustrated in FIG. 1A is exemplary only, and that any other alternative configuration of components suitable for performing the described wireless communication tasks between information handling system 100 information handling system 200 (described further herein) is also possible.

Still referring to FIG. 1A, information handling system 200 includes a host programmable integrated circuit (PIC) 205 (e.g., such as an Intel Pentium series processor, an Advanced Micro Devices (AMD) processor or one of many other CPU processors currently available) that are coupled together in this embodiment with a platform controller hub (PCH) 206. Host programmable integrated circuit 205 may be configured to execute a system BIOS 201 (e.g., such as a unified extensible firmware interface "UEFI" BIOS) that includes an initially-loaded first BIOS boot block (primary initial boot block (IBB) 260a or secondary IBB 260b), and a subsequently loaded second BIOS boot block (original equipment manufacturer boot block (OBB) 261. Host programmable integrated circuit 205 may also be configured to execute an operating system (OS) 203 such as Windows-based operating system, Linux-based operating system, etc. (i.e., when the OS 203 is successfully booted) and one or more user applications 204 such as Internet browser, word processing application, spreadsheet application, computer game, etc. (i.e., when the OS 203 is successfully booted). However, in a no-boot situation resulting from a corrupt or damaged original equipment manufacturer boot block (OBB) 261, OS 203 cannot be booted on host programmable integrated circuit 205 until an uncorrupted and undamaged copy of the OBB 261 is recovered to the system 200.

In the embodiment of FIG. 1A, an embedded controller (EC) 270 of information handling system 200 may also be coupled to PCH 206 as shown, and may execute firmware (FW) 271 that is programmed to perform various tasks such as power management, I/O control, etc. Firmware 271 of EC 270 may also be programmed to perform one or more wireless communication tasks (e.g., negotiation, authentication, etc.) for facilitating communication between information handling system 100 and information handling system 200. Non-volatile memory (NVM) storage 211 (e.g., embedded and partitioned flash memory, Electrically Erasable Programmable Read Only Memory—EEPROM, etc.) may be coupled via PCH 206 to be in communication with EC 270 and host programmable integrated circuit 205. NVM 211 may store persistent information for EC 270 and host programmable integrated circuit 205, e.g., including Advanced Configuration and Power Interface (ACPI) information, as well as other information such as system basic input/output system (BIOS) firmware, etc. In one embodiment, NVM 211 may be serial peripheral interface (SPI) flash memory.

As described further herein, firmware 271 of EC 270 may be programmed to control loading of either primary initial boot block (IBB) 260a or secondary IBB 260b of system BIOS 201 onto host programmable integrated circuit 205, i.e., based on the integrity and current operative status of IBB 260a as determined by EC 270. Host programmable integrated circuit 205 may be programmed to then execute either IBB 260a or 260b (as the case may be) to verify the integrity of the existing image of OBB 261 by checking the existing image of the OBB 261 on information handling system 200 for corruption or damage. If EC 270 determines (by communication from IBB 260a or 260b) that integrity of the existing OBB 261 is not verified (i.e., the OBB 261 is corrupted or damaged), firmware 271 of EC 270 may be programmed to respond by letting the system BIOS 201 boot to fetch a local recovery image for OBB 261 from an extensible firmware interface (EFI) system partition (or ESP partition) of media drive/s 235.

In the case where a local recovery image is absent (or the requested media drive 235 does not exist), firmware 271 of EC 270 may be programmed to respond by letting the system BIOS 201 boot on host programmable integrated circuit 205 to a special firmware volume (FV) 263 (e.g., stored on NVM 211) that has wireless network connectivity (e.g., via Bluetooth connection) to fetch a new latest uncorrupted and undamaged recovery image for OBB 261 from BIOS recovery application 107 that is executing on host programmable integrated circuit 105 of information handling system 100. System BIOS 201 executing on host programmable integrated circuit 205 then uses FV 263 to pull the new recovery image for OBB 261 from information handling system 100 to information handling system 200 via the wireless connection, and then to replace the corrupted or damaged original existing image of OBB 261.

Figure 1B:
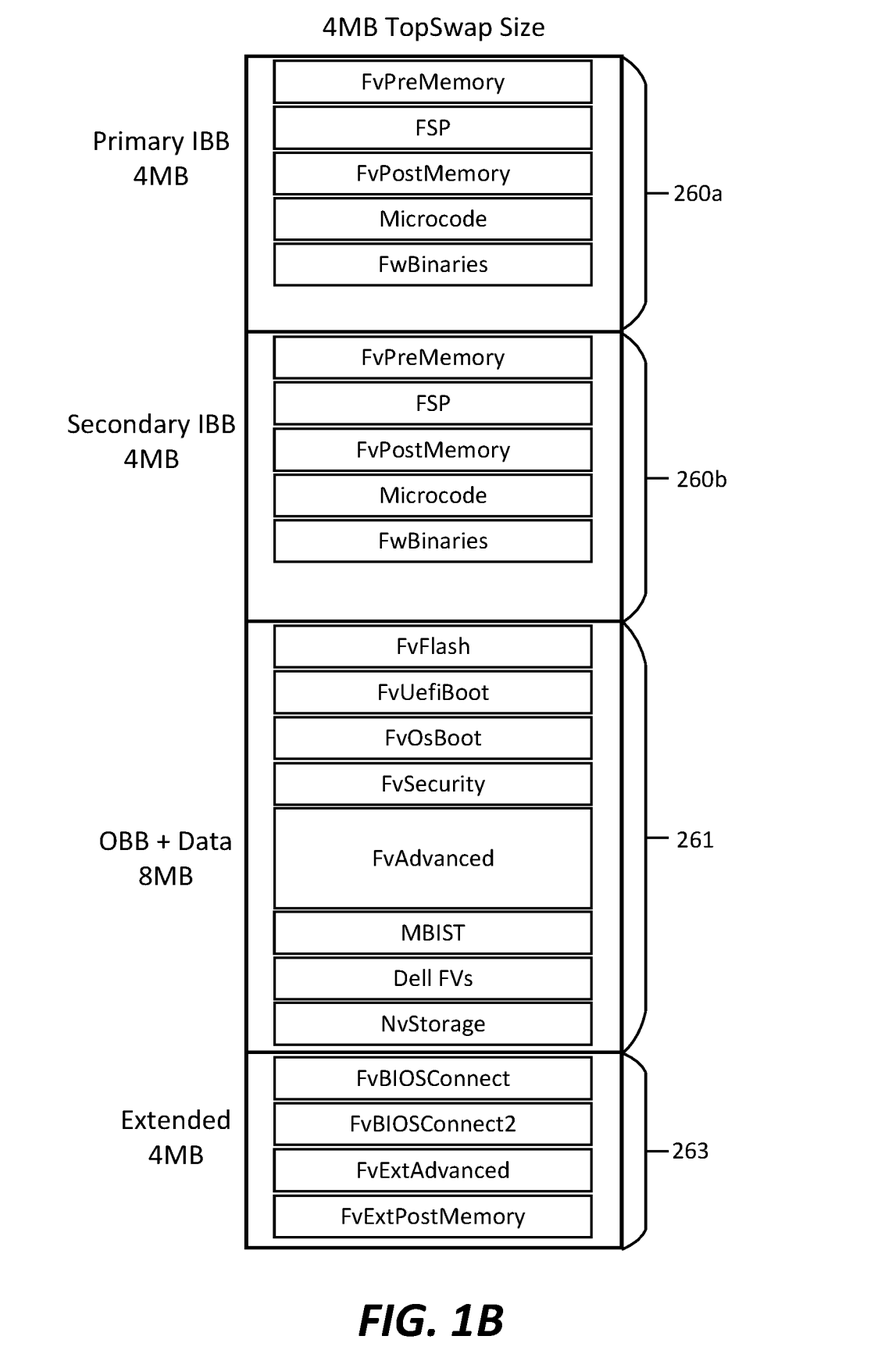
FIG. 1B illustrates components of primary initial boot block (IBB), secondary initial boot block (IBB), OEM boot block (OBB) and wireless FV according to one exemplary embodiment of the disclosed systems and methods.

In the embodiment of FIG. 1A, NVM 211 may also store wireless authentication and negotiation information (e.g., Classic Bluetooth firmware stack or other appropriate wireless firmware stack) as at least a part of wireless firmware volume 263 that may be accessed and utilized by host programmable integrated circuit 205 for performing wireless communication tasks described further herein. Other information which may be stored on NVM 211 for execution by host programmable integrated circuit 205 includes primary initial boot block (IBB) 260a, secondary IBB 260b (i.e., a duplicate copy of the code of primary IBB 260a), and a single copy of the original equipment manufacturer (OEM) boot block (OBB) 261. FIG. 1B illustrates an exemplary embodiment of the components of primary IBB 260a, secondary IBB 260b, OBB 261 and wireless FV 263 as they may be stored on NVM 211.

Primary IBB 260a and secondary IBB 260b are smaller firmware blocks than OBB 261, and each includes instructions for basic tasks such as initiating communication between hardware components of information handling system 200 (e.g., between host programmable integrated circuit 205, embedded controller 270, platform controller hub 206, etc.) and for loading the OBB 261 on host programmable integrated circuit 205. In one exemplary embodiment of the disclosed systems and methods, each of primary IBB 260a and secondary IBB 260b also includes code executable by host programmable integrated circuit 205 for initializing (dispatching) a wireless firmware stack (e.g., Classic Bluetooth wireless firmware stack) upon detecting of corruption in OBB 261 using the wireless firmware volume 263 from SPI flash NVM 211 in a manner as described further herein.

OBB 261 is a larger firmware block than each of the IBB 260a and secondary IBB 260b, and includes additional code instructions particular to the platform design of the information handling system 200 (e.g., such as for initializing an OS loader and/or drivers that load and boot the main operating system on the host central processing unit 205, etc.). In one embodiment of the disclosed systems and methods, a new recovered uncorrupted and undamaged latest copy of OBB 261 may be executed as part of system BIOS 201 on host programmable integrated circuit 205 after it has been recovered to successfully boot to OS 283 on host programmable integrated circuit 205 in the case where the previously-existing version of OBB 261 is corrupted or damaged, e.g., as described further herein. A custom profile 265 (e.g., generic attribute profile (GATT) device profile that defines Classic Bluetooth GATT commands and requests (as well as notifications and indications) for communication between information handling system 200 and information handling system 100) is also stored on NVM 211 and may be executed by host programmable integrated circuit 205 in order to provide functionality for file transfer and notification. It will be understood that other embodiments, non-volatile memory or other non-volatile storage device/s (e.g., such as hard disk drive and/or optical drive, etc.) may also or alternatively be provided elsewhere in system 200 for storing such information, e.g., such as media drives 235.

Still referring to FIG. 1A, a wireless radio module (radio) 280 may be coupled to host programmable integrated circuit 205 via wireless controller 283 and PCH 206, and one or more antenna element/s 282 may in turn be coupled to radio module 280 as shown. Further information on configuration, operation, and use of wireless radio modules with information handling systems may be found, for example, in U.S. Pat. Nos. 9,853,748 and 11,194,374, each of which is incorporated herein by reference in its entirety for all purposes. In similar manner as described for information handling system 100, wireless controller 283 which may be, for example, a microcontroller executing logic components of Classic Bluetooth wireless protocol, e.g., Bluetooth 4.x version (Bluetooth 4.0, 4.1, 4.2, etc.) core specification protocol and/or Bluetooth 5.x version (including Bluetooth 5.0, 5.1, 5.2, 5.3, etc.) core specification protocol that are each available together with addendums and supplements thereto from the Bluetooth Special Interest Group (SIG).

It will be understood that in other embodiments, other wireless communication protocols may be employed in place of Classic Bluetooth wireless protocol for wireless communication between wireless controller 181/radio module 180/antenna 182 of information handling system 100 and wireless controller 283/radio module 280/antenna 282 of information handling system 200 to implement systems and methods disclosed herein. Examples of such other wireless communication protocols include, but are not limited to, non-Bluetooth wireless communication protocols such as IEEE 802.11x WiFi protocol, IEEE 802.15.4 Zigbee protocol, near field communication (NFC) protocol such as ISO/IEC 14443 and FeliCa, ISO/IEC 18092, GSMA NFC Standards, etc. In one embodiment, host programmable integrated circuit 205 may also be programmed to execute code and/or application programming interfaces (APIs), and to provide communication data to wireless controller 283 (e.g., data that includes information for advertisement, services, encryption, authentication, pairing, connection, bonding, etc.) that facilitates wireless communication between components of information handling system 200 and information handling system 100.

Wireless controller 283 may be configured to manage transmission from information handling system 200 of data provided to wireless controller 283 from host programmable integrated circuit 205 by providing this data as outgoing wireless protocol data in a controlled manner for transmission via antenna element/s 282 by radio hardware module 280, which may include one or more radio circuit components such as baseband processor, transmitter, receiver, transceiver, etc. Wireless controller 283 may also manage incoming wireless protocol data received via antenna element/s 282 by radio hardware module 280 from radio hardware module 180 and antenna element/s 182 of information handling system 100, and to receive information of this received incoming data from radio hardware module 280. Wireless controller 283 in turn passes this data via PCH 206 to host programmable integrated circuit 205 for further processing. In this way, wireless controller 283 of information handling system 200 may exchange wireless protocol data (e.g., negotiation and connection requests, authentication information, etc.) with information handling system 100.

Figure 2:
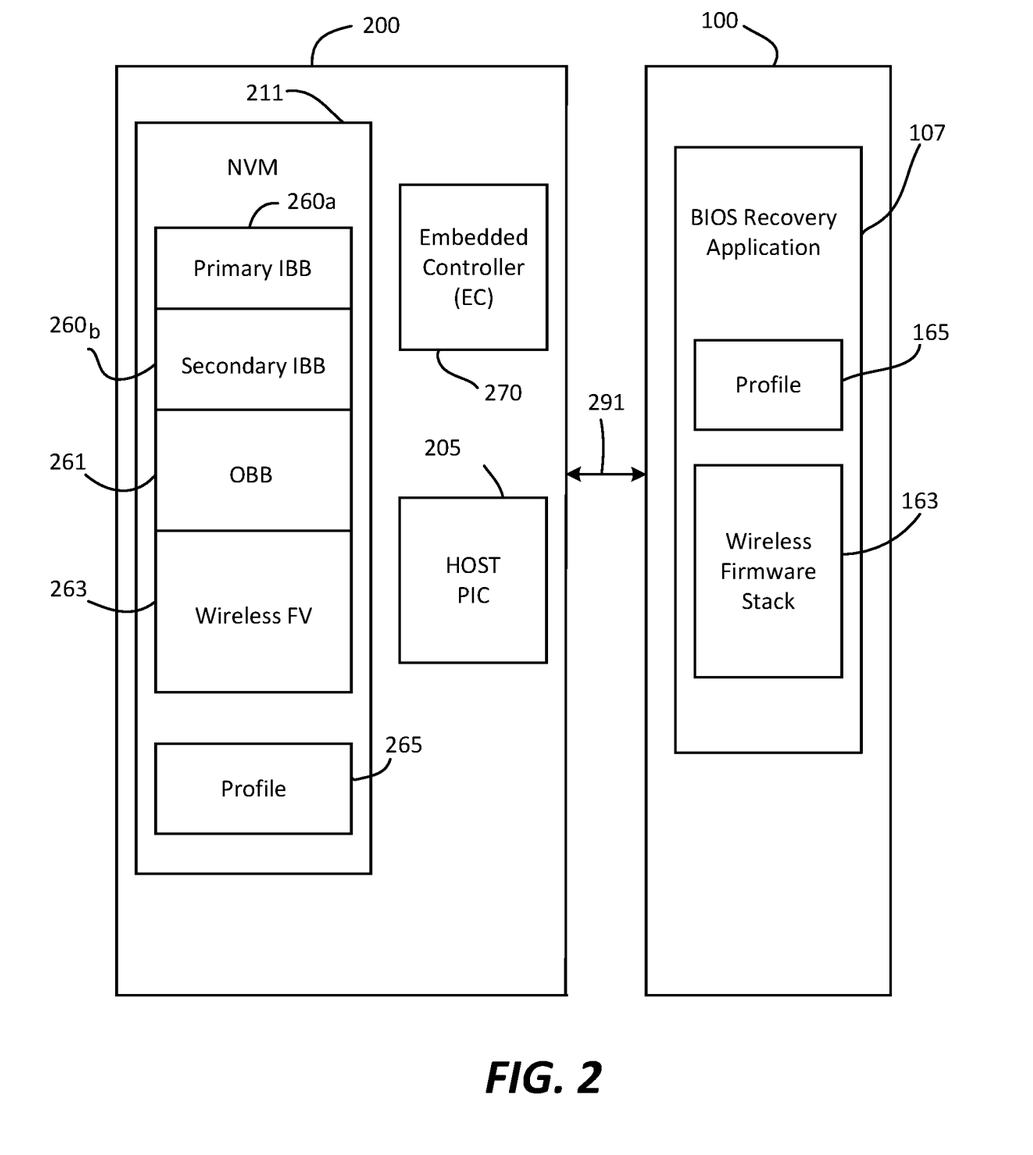
FIG. 2 is a block diagram illustrating one exemplary embodiment of a wireless data exchange relationship according to one exemplary embodiment of the disclosed systems and methods.

In the exemplary embodiment of FIG. 2, wireless controller 283 may also receive wireless protocol data that includes a recovered (new uncorrupted and undamaged) latest copy of OBB code and other BIOS recovery information from information handling system 100. It will be understood that the particular configuration of information handling system 200 illustrated in FIG. 1A is exemplary only, and that any other alternative configuration of components suitable for performing the described wireless communication tasks between information handling system 200 and information handling system 100 is also possible.

In one exemplary embodiment, system 200 may optionally include a network interface controller (NIC) 289 that is in wired and/or wireless network communication with network 150. NIC 289 may be coupled to PCH 206 as shown, and may optionally communicate with network 150 via one or more intervening networks, e.g., such as a wired or wireless local area network (LAN).

Volatile main system memory 215 (e.g., dynamic random access memory "DRAM", etc.) and a display controller 220 may be coupled as shown to host programmable integrated circuit 205, with a display device 225 (e.g., video monitor) coupled to display controller 220 to provide visual images (e.g., via graphical user interface) to a human user, e.g., via eDP components 219 such as eDP cable and eDP connector. Media drives 235 (e.g., hard disk drive, optical drive, solid state drive, etc.) may be coupled as shown to host programmable integrated circuit 205 via PCH 206 to provide permanent storage for the information handling system. Also illustrated are optional local input device/s 245 such as a keyboard and/or a mouse/touchpad that may be coupled via hardwire and PCH 206 to host programmable integrated circuit 205 to enable the user to interact via hardwire (e.g., such as USB bus) with the information handling system. Not shown in FIG. 1A is an optional expansion bus (e.g., such as PCI bus, PCI Express bus, SATA bus, USB, etc.) that may also be coupled to PCH 206 to provide the information handling system with additional plug-in functionality.

In the embodiment of FIG. 1A, information handling system 200 is coupled to an external source of power (e.g., AC mains and an optional AC adapter in the case of a battery-powered portable information handling system such as a notebook computer, tablet computer, etc.). As shown, a power circuit 260 may be provided within information handling system 200 to receive external AC or DC power from external power source 250 and provide a regulated source of DC power to power-consuming components of information handling system 200. Power circuit 260 may also optionally include a smart battery pack in those embodiments where system 200 is a battery-powered portable information handling system.

FIG. 2 is a block diagram illustrating one exemplary embodiment of a wireless data exchange relationship using wireless communications 291 (e.g., Classic Bluetooth wireless communications) between logic executing on host programmable integrated circuit 205 of wireless information handling system 200 and logic executing on host programmable integrated circuit 105 of wireless information handling system 100 of FIG. 1A. In the embodiment FIG. 2, firmware code for execution as part of BIOS 201 by host programmable integrated circuit 205 is stored on SPI flash NVM 211, and includes primary IBB 260a, secondary IBB 260b, OBB 261, wireless firmware volume 263 (with wireless firmware stack 264) and custom profile 265. In the embodiment of FIG. 2, logic executing on host programmable integrated circuit 105 of wireless information handling system 100 includes BIOS recovery application 107 that includes wireless firmware stack 163 and custom profile 165.

Figure 3:
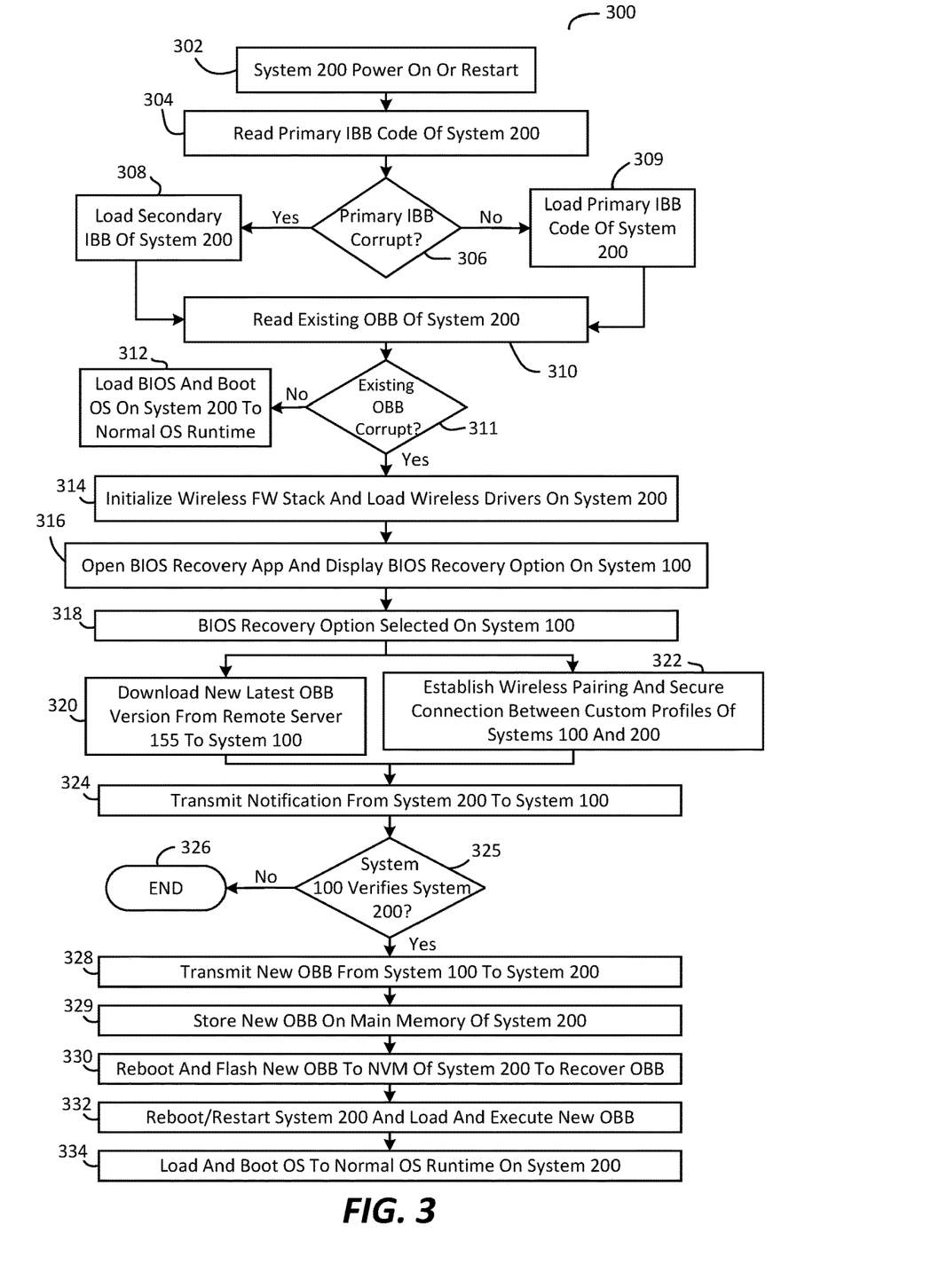
FIG. 3 illustrates methodology according to one exemplary embodiment of the disclosed systems and methods.
Figure 4:
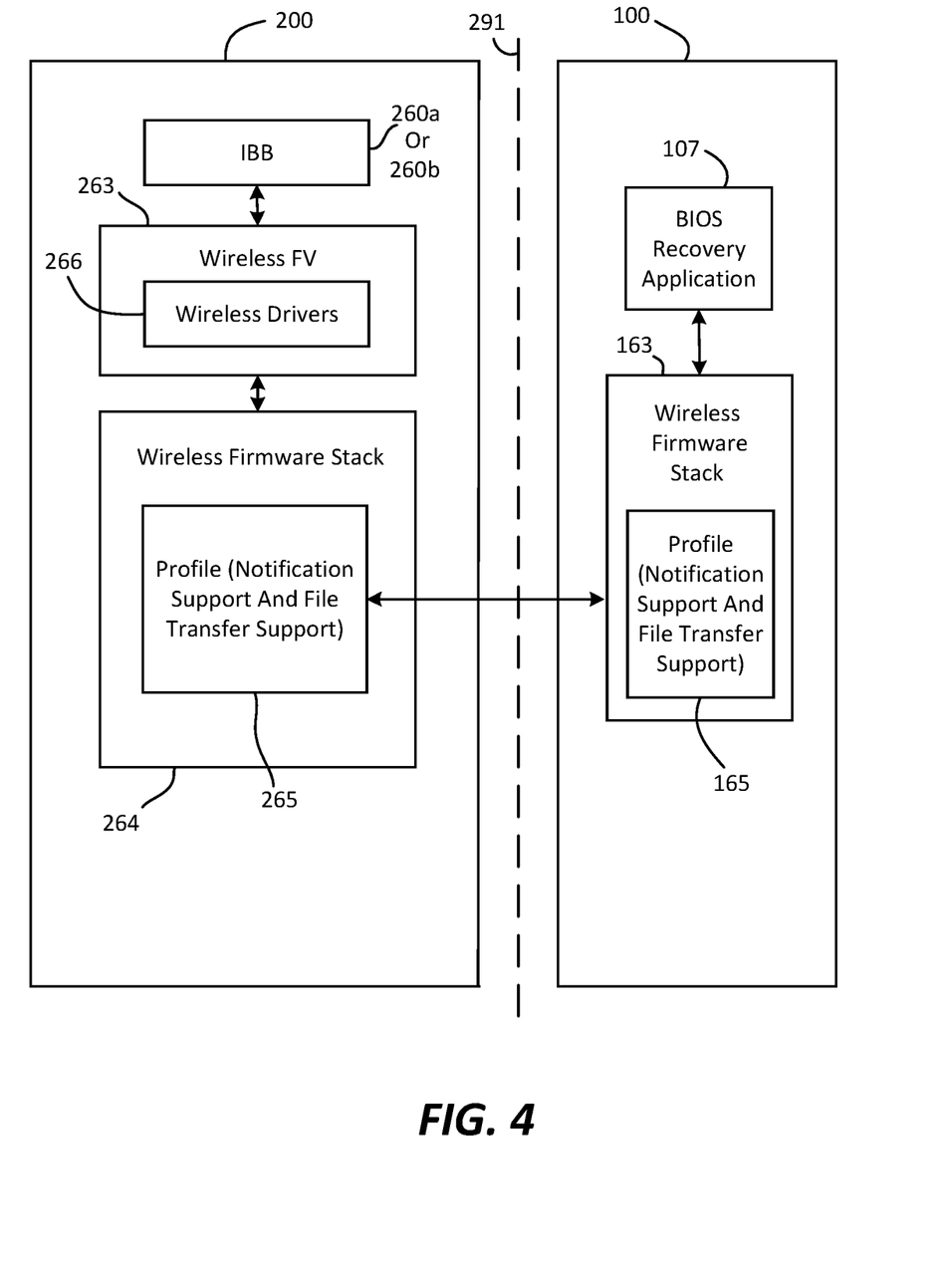
FIG. 4 illustrates interrelation of selected hardware and logic components of first and second information handling systems according to one exemplary embodiment of the disclosed systems and methods.

FIG. 3 illustrates one exemplary embodiment of OBB recovery methodology 300 that may be implemented according to disclosed systems and methods. In the following exemplary description, the methodology 300 of FIG. 3 is described with reference to the FIGS. 1, 3 and 4 (the latter showing one exemplary embodiment of interrelation of selected hardware and logic components of information handling systems 100 and 200), the logic flow of FIG. 5 (in the case that primary IBB 260a is not corrupted), and the logic flow of FIG. 6 (in the case that primary IBB 260a is corrupted).

As shown, methodology 300 begins in block 302 upon power ON of system 200 from an OFF state or upon a restart of system 200. Next, methodology 300 proceeds to block 304 where EC 270 reads primary IBB region 260a on SPI flash NVM 211 and checks for corruption or damage of primary IBB 260a, e.g., by verifying the HASH of primary IBB 260a. If EC 270 finds primary IBB 260a not corrupted of damaged in block 306 (see FIG. 4) (e.g., primary IBB 260a HASH is verified in block 306), then methodology 300 proceeds to block 309 where EC 270 instructs host programmable integrated circuit 205 to load primary IBB 260a from SPI flash NVM 211. However, if EC 270 finds primary IBB 260a corrupted or damaged in block 306 (e.g., primary IBB 260a HASH is not verified in block 306) (see FIG. 5), then methodology 300 proceeds to block 308 where EC 270 instructs host programmable integrated circuit 205 to load secondary IBB 260b from SPI flash NVM 211 and proceeds to block 310.

Figure 5:
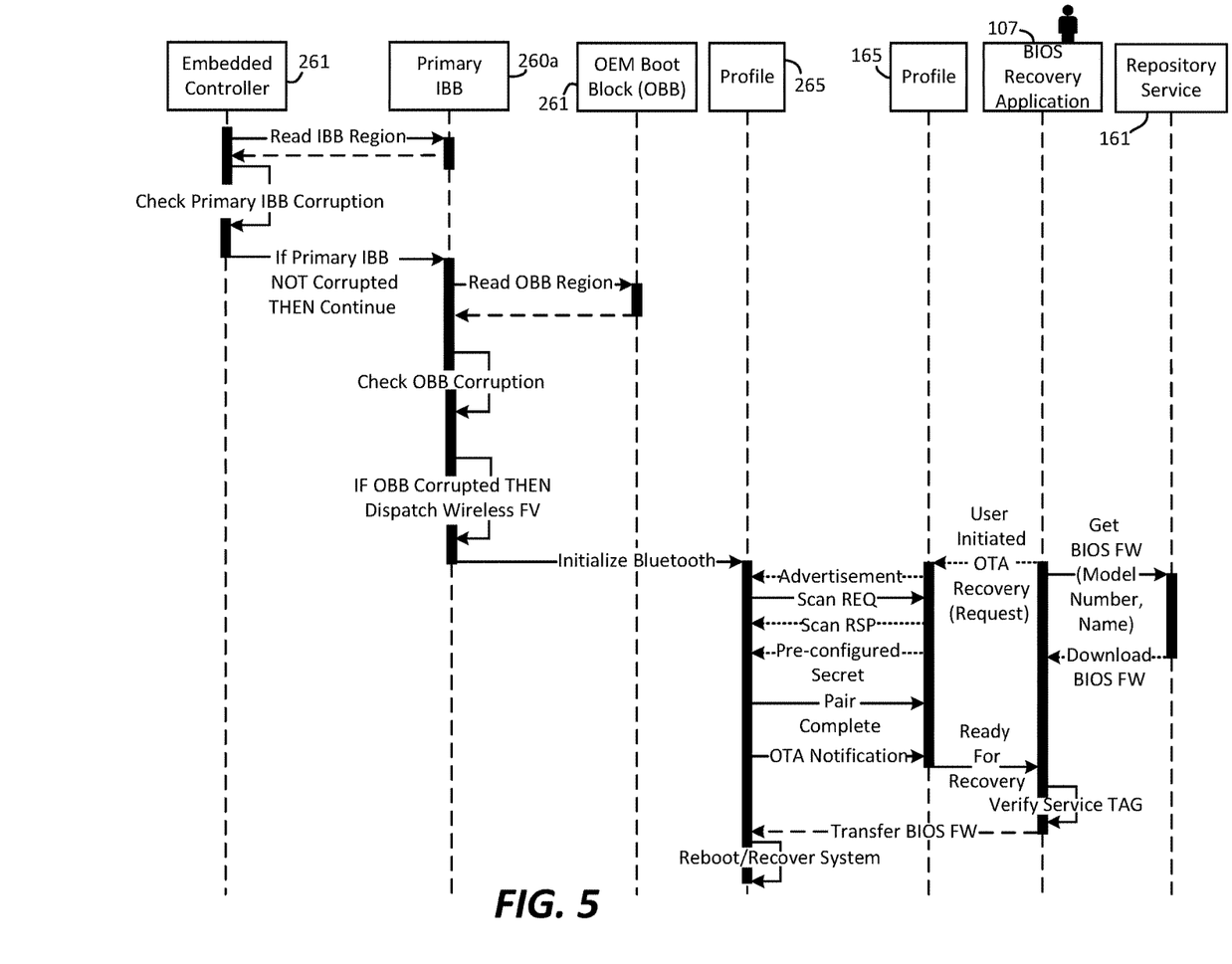
FIG. 5 illustrates log according logic flow one exemplary embodiment of the disclosed systems and methods.
Figure 6:
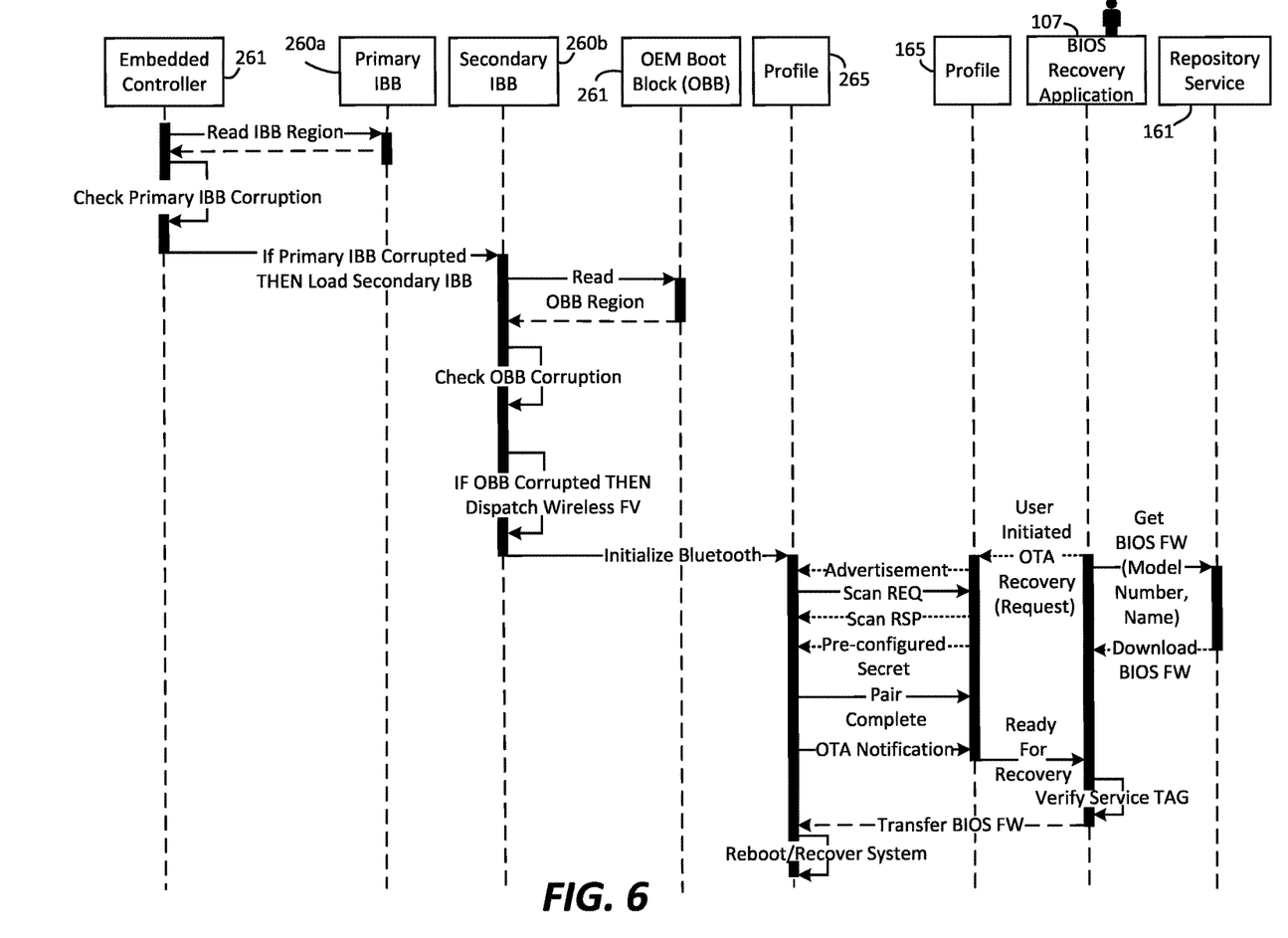
FIG. 6 illustrates log according logic flow one exemplary embodiment of the disclosed systems and methods.

Next, in block 310 EC 270 instructs host programmable integrated circuit 205 to execute primary IBB 260a (see FIG. 4) or secondary IBB 260b (see FIG. 5) to read existing OBB region 261 from SPI flash NVM 211 and to attempt to verify the integrity of the existing OBB 261 by checking for corruption or damage of the existing OBB 261 by verifying the HASH of an uncorrupted and undamaged version of OBB 261 (see FIGS. 5 and 6). If IBB 260a or 260b executing on host programmable integrated circuit 205 (i.e., as the case may be) finds the existing copy of OBB 261 not corrupted not damaged (the OBB HASH is verified) in block 311, then the integrity of the existing copy of OBB 261 is verified and methodology 300 proceeds to block 312 where host programmable integrated circuit 205 loads the existing copy of OBB 261 of BIOS 201, and OS 203 is booted and executed by host programmable integrated circuit 205 so that normal OS runtime proceeds on host programmable integrated circuit 205.

However, if IBB 260a or 260b executing on EC 270 (i.e., as the case may be) finds the existing copy of OBB 261 to be corrupted or damaged (the OBB HASH is not verified) and thus existing copy of OBB 261 not verified in block 311 in the case that no local recovery image for OBB 261 exists on media drive/s 235, then a "no boot" condition exists on system 200, and methodology 300 proceeds to block 314 where IBB 260a or 260b executing on host programmable integrated circuit 205 initializes (dispatches) wireless firmware stack (e.g., Classic Bluetooth wireless firmware stack) using the wireless firmware volume 263 from SPI flash NVM 211. Also in block 314. IBB 260a or 260b executing on host programmable integrated circuit 205 loads wireless drivers 266 and hands over control to the wireless drivers 266 of the wireless firmware stack that are executing on host programmable integrated circuit 205. Once the wireless drivers 266 are loaded in block 314, system 200 is ready to be paired with the BIOS recovery application 107 on system 100, e.g., using Classic Bluetooth protocol.

In block 316, a current human user of system 100 opens a user interface for BIOS recovery application on a video display of I/O interface 103 (e.g., touchscreen) of system 100. This may occur, for example, when the current user separately determines that system 200 is in the no-boot status (i.e., the same no-boot status previously described above in block 310) by observing unresponsiveness of system 200, observing no-boot error message/s on display 225 of system 200, etc. Also in block 316, the current user may respond to observation of the no-boot status by performing a user action to open BIOS recovery application 107 on system 100. For example, in one embodiment, the user may click a GUI icon displayed on I/O interface 103 to open BIOS recovery application 107, which then displays a GUI dashboard on I/O interface 103 of system 100 to view inventory 167 of firmware components assigned to information handling system 200, and that is stored in NVM 111 of information handling system 100 and that is retrieved and managed by BIOS recovery application 107 executing on host programmable integrated circuit 105 of information handling system 100.

With regard to block 316, BIOS recovery application 107 manages inventory 167 of components (e.g., including installed firmware components) on information handling system 200 that is synchronized (i.e., synchronized or synced to be the same) via network 150 and remote server 155 with an inventory of system 200 components that is maintained in user account information 159 on database 156 for the information handling system 200. This inventory 167 includes (or identifies) the particular correct version of OBB 261 that is assigned (e.g., assigned by the OEM of system 200) to the particular information handling system 200 owned by the current user. In block 316, BIOS recovery application 107 displays a BIOS recovery icon or button (e.g., an "Over-The-Air BIOS Recovery" option) in the GUI dashboard displayed on I/O interface 103 for recovering an uncorrupted and undamaged copy of the latest correct version of OBB 261 to the system 200. In block 318, the current user may perform a user action to initiate OBB BIOS recovery by clicking on or otherwise selecting the displayed BIOS recovery option on GUI I/O interface 103 of system 100 for recovering the latest uncorrupted and undamaged correct version of OBB 261 from remote server 155 to system 200.

As an alternative to requiring a user to click displayed icons of a GUI of I/O interface 103 (described above for blocks 316 and 318) to initiate OBB BIOS recovery, a human user may instead perform other types of user actions in another exemplary embodiment to initiate OBB BIOS recovery, e.g., by operating camera 144 of information handling system 100 (e.g., such as smartphone) to scan a BIOS recovery quick response (QR) code that may optionally be automatically displayed by IBB 260a or 260b on display device 225 of information handling system 200 (e.g., such as a notebook computer) upon determination in block 311 that OBB 261 is corrupt or damaged. This BIOS recovery QR code may provide instructions when read by information handling system 100 (e.g., under control of a user) to cause host programmable integrated circuit 105 of information handling system 100 to automatically open and execute BIOS recovery application 107 to both download to information handling system 100 the latest uncorrupted and undamaged correct version of BIOS OBB firmware 261 for information handling system 200 from cloud-based firmware repository service 161 hosted on remote server 155 (as described herein for block 320), and to initiate wireless pairing and a secure wireless connection (e.g., a Classic Bluetooth secure wireless connection) between information handling system 100 and information handling system 200 (as described herein for block 322). In this alternative embodiment, the user is not required to click icons displayed as a GUI on I/O interface 103 in the manner described for blocks 316 and 318.

Returning to methodology 300 of FIG. 3, BIOS recovery application 107 executing on host programmable integrated circuit 105 of information handling system 100 responds in blocks 320 and 322 to the user action (e.g., user selection) in block 318 of the displayed BIOS recovery option on a GUI of I/O interface 103 (or alternatively to reading the instructions of the QR code described above). In one embodiment, blocks 320 and 322 are then performed in parallel, although this is not necessary.

In block 320, BIOS recovery application 107 downloads the latest uncorrupted and undamaged correct copy of BIOS OBB firmware 261 for system 200 by providing the model number and/or model name of information handling system 200 (e.g., as included in and read from inventory 167) across network 150 to the cloud-based firmware repository service 161 hosted on remote server 155, and then downloads across network 150 from the cloud-based firmware repository service 161 the latest uncorrupted and undamaged version of OBB 261 for system 200 that the cloud-based firmware repository service 161 determines is appropriate for the particular model number and/or model name of information handling system 200 that is provided by BIOS recovery application 107.

In block 322, BIOS recovery application 107 uses wireless firmware stack 163 and custom profile 165 of information handling system 100 to initiate wireless pairing and a secure wireless connection (e.g., a Classic Bluetooth secure wireless connection) with information handling system 200 through custom profile 165 and wireless firmware volume 263 and custom profile 265 of information handling system 200 (i.e., which are executing on host programmable circuit 205 of information handling system 200). This pairing and connection of block 322 is illustrated in FIGS. 5 and 6, i.e., by sequential wireless transmission of advertisement, scanning request and scanning request packets, preconfigured secret and over the air (OTA) notification between custom profile 165 and custom profile 265 as wireless communications 291 between custom profiles 263 and 265 shown in FIGS. 5 and 6. During block 322, both the BIOS recovery application 107 and wireless firmware volume 263 and custom profile 265 use preconfigured secrets (e.g., preconfigured secret key/s) to establish trust between information handling system 100 and information handling system 200. Wireless (e.g., Classic Bluetooth) communication is then established as a secure wireless connection (e.g., a Classic Bluetooth secure wireless connection) between system 200 and system 100 by the wireless drivers 266 of information handling system 200. Information handling system 200 is now ready for OBB recovery via information handling system 100.

After wireless pairing and a secure wireless connection are established in block 322 between information handling system 100 and information handling system 200, then in block 324 host programmable integrated circuit 205 on information handling system 200 wirelessly transmits (i.e., as a wireless communication 291) a ready-for-recovery notification (e.g., a notification of the existence of a "No Boot" condition) together with a unique identifier (e.g., serial number or service tag) for the particular information handling system 200 to BIOS recovery application 107 on information handling system 100.

Next, in block 325, BIOS recovery application 107 responds to wireless receipt from host programmable integrated circuit 205 of the notification and unique identifier of information handling system 200 by verifying that the received unique identifier is the same as the unique identifier for information handling system 200 that is contained in system inventory 167, e.g., to ensure the ownership and integrity of information handling system 200. If the verification of block 325 fails (i.e., the unique identifier received from host programmable integrated circuit 205 is found not to be the same as the unique identifier for information handling system 200), then methodology 300 terminates without further action (i.e., an uncorrupted and undamaged version of OBB 261 is not recovered for system 200) in block 326.

However, if the verification of block 325 passes (i.e., the unique identifier received from host programmable integrated circuit 205 is found to be the same as the unique identifier for information handling system 200), then methodology 300 proceeds to block 328 where BIOS recovery application 107 of information handling system 100 wirelessly transmits the uncorrupted and undamaged firmware image of OBB 261 (i.e., that was previously downloaded in block 320) as a wireless communication 291 to host programmable integrated circuit 205 of information handling system 200 via the wireless firmware stack 163 and custom profiles 163 and 263. Custom profile 263 executing on host programmable integrated circuit 205 then in block 329 runtime stores the uncorrupted and undamaged firmware image of OBB 261 on the volatile main system memory 215 of information handling system 200.

After block 329 is completed and uncorrupted and undamaged firmware image of OBB 261 is stored on the volatile main system memory 215 of information handling system 200, methodology 300 proceeds to block 330 where custom profile 265 executed by host programmable integrated circuit 205 causes information handling system 200 to automatically perform a soft reboot to start the flash of the uncorrupted and undamaged OBB 261 image from main system memory 215 to SPI flash NVM 211 to complete the OBB recovery process by replacing the previously-existing copy of OBB 261 with a copy of the uncorrupted and undamaged correct version of OBB 261 for system 200. Upon the next power ON or restart of information handling system 200 (e.g., by the user) in block 332, normal boot sequence occurs post-OBB recovery, i.e., IBB 260a or 260b, and the recovered (uncorrupted and undamaged) OBB 261 of BIOS 201 are loaded and executed by host programmable integrated circuit 205, and OS 203 is loaded and executed on host programmable integrated circuit 205 to achieve normal OS runtime on information handling system 200 in block 334.

It will be understood that methodology of FIG. 3 is exemplary only, and that any combination of fewer, additional and/or alternative blocks may be employed that are suitable for using a first information handling system 100 to accomplish wireless (over the air) OBB recovery for a second and different information handling system 200 according one or more of the techniques of the disclosed systems and methods that are described herein.

It will also be understood that one or more of the tasks, functions, or methodologies described herein (e.g., including those described herein for components 105, 107, 153, 155, 156, 157, 159, 163, 165, 167, 180, 181, 189,201, 203, 204, 205, 206, 211, 220, 270, 260a, 260b, 261, 280, 283, 289, etc.) may be implemented by circuitry and/or by a computer program of instructions (e.g., computer readable code such as firmware "FW" code or software "SW" code) embodied in a non-transitory tangible computer readable medium (e.g., optical disk, magnetic disk, non-volatile memory device, etc.), in which the computer program comprising instructions is configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus, the invention is not limited to only those combinations shown herein, but rather may include other combinations.

What is claimed is:

1. A method, comprising:
   reading an existing basic input/output system (BIOS) boot block from a non-volatile memory of a first information handling system;
   attempting to verify integrity of the existing BIOS boot block of the first information handling system;
   if integrity of the existing BIOS boot block of the first information handling system is verified, then loading and executing the existing BIOS boot block from the non-volatile memory of the first information handling system and booting an operating system (OS) of the first information handling system; and
   if integrity of the existing BIOS boot block of the first information handling system is not verified, then:
      establishing a secure wireless connection between the first information handling system and a second and different information handling system,
      then downloading a new copy of the BIOS boot block across the secure wireless connection from the second information handling system to the first information handling system,
      then storing the new copy of the BIOS boot block on the non-volatile memory of the first information handling system, and
      then loading and executing the new BIOS boot block of the first information handling system from the non-volatile memory of the first information handling system and booting the operating system (OS) of the first information handling system.

2. The method of claim 1, where the BIOS boot block is an original equipment manufacturer (OEM) boot block (OBB).

3. The method of claim 2, further comprising first loading and executing an initial boot block (IBB) from the non-volatile memory of the first information handling system; and then executing the IBB to perform the attempting to verify integrity of the existing BIOS boot block of the first information handling system.

4. The method of claim 3, where the first loading and executing an IBB from the non-volatile memory of the first information handling system comprises:
   reading a primary IBB from the non-volatile memory of the first information handling system;
   then attempting to verify the integrity of the primary IBB;
   if integrity of the primary boot block is verified, then loading and executing the primary IBB from the non-volatile memory of the first information handling system; and
   if integrity of the primary boot block is not verified, then loading and executing a secondary IBB from the non-volatile memory of the first information handling system.

5. The method of claim 1, where the establishing the secure wireless connection between the first information handling system and the second and different information handling system comprises:

loading a wireless firmware volume and a first wireless firmware stack from the non-volatile memory of the first information handling system, and executing the first wireless firmware stack on the first information handling system;

responding to a user action received at the second information handling system by executing an application on the second information handling system to cause a second wireless firmware stack of the second information handling system to wirelessly communicate with the first wireless firmware stack of the first information handling system to initiate and establish the secure wireless connection with the first wireless firmware stack of the first information handling system.

6. The method of claim 1, where if the integrity of the existing BIOS boot block of the first information handling system is not verified, the method further comprises responding to a user action received at the second information handling system by executing an application on the second information handling system to:

first download the new copy of the BIOS boot block across a network to the second information handling system from a remote server that is different from the first and second information handling systems, and then download the new copy of the BIOS boot block across the secure wireless connection from the second information handling system to the first information handling system.

7. The method of claim 6, where the user action comprises making a user input to an input/output (I/O) interface of the second information handling system, or causing a camera of the second information handling system to read a quick response (QR) code displayed on a display device of the first information handling system.

8. The method of claim 1, where if the integrity of the existing BIOS boot block of the first information handling system is not verified, the method further comprises:

wirelessly transmitting a notification and a unique identifier for the first wireless information handling system across the secure wireless connection from the first information handling system to the second information handling system, the notification informing the second information handling system that a no-boot condition exists on the first information handling system;

then determining on the second information handling system whether the transmitted unique identifier from the first wireless information handling system matches a unique identifier that is included in a component inventory for the first information handling system that is stored in non-volatile memory of the second information handling system; and then only downloading the new copy of the BIOS boot block across the secure wireless connection from the second information handling system to the first information handling system if the transmitted unique identifier from the first information handling system is determined to match the unique identifier of the component inventory that is stored on the second information handling system.

9. The method of claim 1, where the then storing the new copy of the BIOS boot block on the non-volatile memory of the first information handling system further comprises storing the new copy of the BIOS boot block on a volatile system memory of the first information handling system, and then transferring the new copy of the BIOS boot block volatile system memory of the first information handling system to the non-volatile memory of the first information handling system.

10. The method of claim 1, where the first information handling system comprises a personal computer system, and where the second information handling system comprises a smart phone or tablet computer system.

11. A system, comprising a first information handling system that comprises at least one first programmable integrated circuit coupled to a non-volatile memory, and a first radio coupled between a first antenna and the at least one first programmable integrated circuit; where the at least one first programmable integrated circuit is programmed to:

read an existing basic input/output system (BIOS) boot block from the non-volatile memory of a first information handling system; and attempt to verify integrity of the existing BIOS boot block of the first information handling system;

if integrity of the existing BIOS boot block of the first information handling system is verified, then load and execute the existing BIOS boot block from the non-volatile memory of the first information handling system and boot an operating system (OS) of the first information handling system; and if integrity of the existing BIOS boot block of the first information handling system is not verified, then:

establish a secure wireless connection via the first radio and the first antenna between the first information handling system and a second and different information handling system, then download a new copy of the BIOS boot block across the secure wireless connection from the second information handling system to the first information handling system, then store the new copy of the BIOS boot block on the non-volatile memory of the first information handling system, and then load and execute the new BIOS boot block of the first information handling system from the non-volatile memory of the first information handling system and boot the operating system (OS) of the first information handling system.

12. The system of claim 11, where the BIOS boot block is an original equipment manufacturer (OEM) boot block (OBB).

13. The system of claim 12, where the at least one first programmable integrated circuit is programmed to first load and execute an initial boot block (IBB) from the non-volatile memory of the first information handling system, and then execute the IBB to perform the attempt to verify integrity of the existing BIOS boot block of the first information handling system.

14. The system of claim 13, where the at least one first programmable integrated circuit is programmed to first load and execute the initial boot block (IBB) from the non-volatile memory of the first information handling system by:

reading a primary IBB from the non-volatile memory of the first information handling system;

then attempting to verify the integrity of the primary IBB;

if integrity of the primary boot block is verified, then loading and executing the primary IBB from the non-volatile memory of the first information handling system; and if integrity of the primary boot block is not verified, then loading and executing a secondary IBB from the non-volatile memory of the first information handling system.

15. The system of claim 11, further comprising:
the second and different information handling system with the second information handling system comprising at least one second programmable integrated circuit and a second radio coupled between a second antenna and the at least one second programmable integrated circuit;
where the at least one first programmable integrated circuit of the first information handling system is programmed to load a wireless firmware volume and a first wireless firmware stack from the non-volatile memory of the first information handling system, and execute the first wireless firmware stack on the first information handling system; and
where the at least one second programmable integrated circuit of the second information handling system is programmed to respond to a user action received at the second information handling system by executing an application to cause a second wireless firmware stack of the second information handling system to wirelessly communicate via the second radio and the second antenna and the first antenna and the first radio with the first wireless firmware stack of the first information handling system to initiate and establish the secure wireless connection with the first wireless firmware stack of the first information handling system.

16. The system of claim 11, further comprising:
the second and different information handling system with the second information handling system comprising at least one second programmable integrated circuit and a second radio coupled between a second antenna and the at least one second programmable integrated circuit;
where if the at least one first programmable integrated circuit of the first information handling system fails to verify the integrity of the existing BIOS boot block of the first information handling system, then the second programmable integrated circuit is programmed to respond to a user action received at the second information handling system by executing an application to:
first download the new copy of the BIOS boot block across a network to the second information handling system from a remote server that is different from the first and second information handling systems, and
then transmit the new copy of the BIOS boot block across the secure wireless connection from the second information handling system to the first information handling system via the second radio and the second antenna and the first antenna and the first radio.

17. The system of claim 16, where the user action comprises making a user input to an input/output (I/O) interface of the second information handling system, or causing a camera of the second information handling system to read a quick response (QR) code displayed on a display device of the first information handling system.

18. The system of claim 11, further comprising:
the second and different information handling system with the second information handling system comprising at least one second programmable integrated circuit and a second radio coupled between a second antenna and the at least one second programmable integrated circuit;
where if the at least one first programmable integrated circuit of the first information handling system fails to verify the integrity of the existing BIOS boot block of the first information handling system, then the first programmable integrated circuit is programmed to wirelessly transmit a notification and a unique identifier for the first wireless information handling system across the secure wireless connection from the first information handling system to the second information handling system, the notification informing the second information handling system that a no-boot condition exists on the first information handling system; and
where the at least one second programmable integrated circuit of the second information handling system is programmed to:
determine whether the transmitted unique identifier received from the first wireless information handling system matches a unique identifier that is included in a component inventory for the first information handling system that is stored in non-volatile memory of the second information handling system; and
then only download the new copy of the BIOS boot block across the secure wireless connection from the second information handling system to the first information handling system if the transmitted unique identifier received from the first information handling system is determined to match the unique identifier of the component inventory that is stored on the second information handling system.

19. The system of claim 11, where the at least one first programmable integrated circuit is programmed to then store the new copy of the BIOS boot block on a volatile system memory of the first information handling system, and then transfer the new copy of the BIOS boot block from the volatile system memory of the first information handling system to the non-volatile memory of the first information handling system.

20. The system of claim 11, where the first information handling system comprises a personal computer system, and where the second information handling system comprises a smart phone or tablet computer system.

* * * * *